United States Patent
Couñago Lorenzo et al.

(10) Patent No.: US 12,264,646 B2
(45) Date of Patent: Apr. 1, 2025

(54) FOUNDATION DEVICE FOR A WIND TURBINE TOWER AND ASSEMBLY METHOD

(71) Applicant: BLUENEWABLES S.L., Guia de Isora (ES)

(72) Inventors: Bernardino Couñago Lorenzo, Madrid (ES); Óscar Sainz Ávila, Rotterdam (NL); Ismael Fernández Gil, Los Cristianos (ES); Cecilio Barahona Oviedo, Madrid (ES)

(73) Assignee: BLUENEWABLES S.L., Guia de Isora (ES)

( * ) Notice: Subject to any disclaimer, the term of this patent is extended or adjusted under 35 U.S.C. 154(b) by 243 days.

(21) Appl. No.: 17/920,289

(22) PCT Filed: Apr. 20, 2021

(86) PCT No.: PCT/ES2021/070262
§ 371 (c)(1),
(2) Date: Oct. 20, 2022

(87) PCT Pub. No.: WO2021/214362
PCT Pub. Date: Oct. 28, 2021

(65) Prior Publication Data
US 2023/0160367 A1  May 25, 2023

(30) Foreign Application Priority Data

Apr. 20, 2020 (ES) .................. ES202030320

(51) Int. Cl.
*F03D 13/20* (2016.01)
*E02D 5/18* (2006.01)
(Continued)

(52) U.S. Cl.
CPC ............... *F03D 13/25* (2016.05); *E02D 5/18* (2013.01); *E02D 5/74* (2013.01); *E02D 7/28* (2013.01);
(Continued)

(58) Field of Classification Search
CPC . F03D 13/25; F03D 13/22; E02D 5/18; E02D 5/74; E02D 7/28; E02D 27/42; E02D 27/52; E04H 12/2246; Y10S 248/91
See application file for complete search history.

(56) References Cited

U.S. PATENT DOCUMENTS 5,927,227 A    7/1999  Derby
8,696,246 B2 * 4/2014  Polo .................. E02D 27/42
                                              405/207
(Continued)

FOREIGN PATENT DOCUMENTS

GB       2088937 A    6/1982
KR     101629481 B1   6/2016
(Continued)

OTHER PUBLICATIONS

Bockute, Ieva; "Buoyancy and stability analysis of floating offshore wind turbines", University of Dundee; Mar. 2019 (Year: 2019).*

*Primary Examiner* — Benjamin F Fiorello
(74) *Attorney, Agent, or Firm* — Hayes Soloway P.C.

(57) ABSTRACT

A foundation device for a wind turbine tower includes a hollow main body with a lower face and an upper face. Both the lower face and the upper face contain a hollow space. Each of the faces include an outer perimeter and an inner perimeter. The main body additionally includes an outer lateral wall disposed between the outer perimeter of the lower face and the outer perimeter of the upper face, and an inner lateral wall between the inner perimeter of the lower face and the inner perimeter of the upper face. The device (Continued)

further includes a plurality of columns that project from the upper face of the main body.

12 Claims, 8 Drawing Sheets

(51) Int. Cl.
  *E02D 5/74*  (2006.01)
  *E02D 7/28*  (2006.01)
  *E02D 27/42*  (2006.01)
  *E02D 27/52*  (2006.01)
  *E04H 12/22*  (2006.01)
  *F03D 13/25*  (2016.01)

(52) U.S. Cl.
  CPC .............. *E02D 27/42* (2013.01); *E02D 27/52* (2013.01); *E04H 12/2246* (2013.01); *F03D 13/22* (2016.05); *Y10S 248/91* (2013.01)

(56) References Cited

U.S. PATENT DOCUMENTS

| | | |
|---|---|---|
| 9,120,542 B2 | 9/2015 | Choisnet |
| 10,822,760 B2* | 11/2020 | Berenguer .............. E02B 17/02 |
| 2015/0158704 A1 | 6/2015 | Giles et al. |
| 2020/0307745 A1* | 10/2020 | Aguire Suso ........... B63B 39/03 |
| 2020/0325877 A1* | 10/2020 | Karikomi ................ F03D 13/25 |
| 2022/0380006 A1* | 12/2022 | Cobian Babe et al. .................... E02D 27/42 |

FOREIGN PATENT DOCUMENTS

| | | |
|---|---|---|
| WO | 2018150063 A1 | 8/2018 |
| WO | 2020188127 A1 | 9/2020 |

\* cited by examiner

FOUNDATION DEVICE FOR A WIND TURBINE TOWER AND ASSEMBLY METHOD

CROSS-REFERENCE TO RELATED APPLICATIONS AND PRIORITY

This patent application claims priority from PCT Application No. PCT/ES2021/070262 filed Apr. 20, 2021, which claims priority from Spanish Patent Application No. P202030320 filed Apr. 20, 2020. Each of these patent applications are herein incorporated by reference in their entirety.

FIELD OF THE INVENTION

The present invention is comprised among wind platforms installed offshore, as well as among the means needed to perform said installation.

BACKGROUND OF THE INVENTION

When installing an offshore wind turbine, providing a system suitable for building the foundation thereof and stabilization is needed.

There are a number of methods and devices dedicated to such purpose. They can all be classified into two types of classifications: one corresponding to the type of foundation used and one corresponding to the type of structure being taken to the installation site.

According to the first classification, the devices can have a floating or weighted foundation. The first kind are bulkier but do not require very powerful means to take them to the installation site. The second kind are smaller but require large ships to transport them to the installation site.

According to the second classification, assembly can be performed on land (moving the entire assembly to the installation site) or at the installation site itself (moving the foundation and the tower separately).

The relevant technical problem for the present invention refers to weighted foundation devices, intended for being sunk entirely. The processes for assembling the tower, moving the foundation or assembling and sinking the foundation are critical and present their own technical requirements relating to buoyancy, inertias and equipment necessary for their use, being completely unrelated to those devices intended for providing a floating foundation.

Document WO 2018/150063 A1 discloses a maritime structure for laying the foundations of buildings, comprising a polygonal solid body with columns.

The present invention provides an alternative solution for problems related to devices dedicated to the process of installing an offshore wind turbine tower with a weighted foundation.

BRIEF DESCRIPTION OF THE INVENTION

The present invention provides an alternative solution to the problem mentioned above by means of a device according to claim 1. The dependent claims define preferred embodiments of the invention.

Unless otherwise defined, all the (scientific and technical) terms used herein are to be interpreted as one skilled in the art would do. It will therefore be understood that commonly used terms are to be interpreted as one knowledgeable in the subject matter would do, and not in an idealized or strictly formal mode.

Throughout the text, the word "comprises" (and derivatives thereof, such as "comprising") must not be understood in an exclusive manner, but rather must be understood in the sense that they allow for the possibility that what is defined may include additional elements or steps.

An object of the present invention relates to a foundation device for a wind turbine tower, the device being configured to be supported on the seabed, comprising
  a hollow main body comprising a lower face intended for being supported on the seabed and an upper face opposite the lower face; the device being characterized in that
  both the lower face and the upper face contain a hollow space, each of the faces thus comprising an outer perimeter and an inner perimeter;
  the main body further comprises an outer lateral wall arranged between the outer perimeter of the lower face and the outer perimeter of the upper face, and an inner lateral wall between the inner perimeter of the lower face and the inner perimeter of the upper face; and
  the device further comprises a plurality of columns that project from the upper face of the main body.

Foundation devices of this type achieve better stability in relation to weight due to the inner space that is generated by the shape of the upper and lower faces. The displacement volume (understood as the volume of the device subject to Archimedes' principle) is positioned far from its center of gravity, which increases hydrostatic stability.

The vertical columns provide the buoyancy needed during immersion of the structure. This arrangement increases the metacentric height of the main body and therefore the stability of the structure as it is being ballasted towards the seafloor.

In particular embodiments, the device further comprises a floor slab positioned on the lower face, the floor slab being a polygonal surface without inner spaces.

This floor slab is intended for covering the polygonal ring formed between the upper and lower faces. In this manner, the main structure is still a ring, but with a floor, such that, when the device is cast into the sea, water does not penetrate the inner space of the ring, reducing the draft in a port.

In particular embodiments, the distance between the upper face and the lower face is at least four times bigger than the height of the floor slab, where the height of the floor slab is measured in the direction parallel to the distance between the upper face and the lower face.

It is therefore a thin slab compared with the height of the assembly, understood in the direction from the lower face to the upper face (i.e., in the vertical direction when the device is in use). In this way, it does not significantly affect the advantages of stability and weight savings.

In particular embodiments, the hollow space inside the upper face and lower face is such that the ratio between the transverse metacentric radius of the device and the cube root of the displacement volume is greater than 0.003.

One of the main advantages of the invention is that a higher metacentric radius is achieved as compared with conventional solutions. One way to quantify this advantage is with a dimensionless parameter which consists of dividing the transverse metacentric radius between a characteristic length, calculated as the cube root of the displacement volume. This dimensionless parameter, regardless of the size of the foundation device, is greater in devices according to the present invention compared with known devices. The size of the inner space allows for this increase and this advantage.

In particular embodiments, at least one of the columns is hollow. In particular embodiments, the inside of at least one of the columns is in communication with the inside of the main body.

This allows the columns to also provide a hollow space for receiving the ballast and being able to better control the sinking of the device during the installation process.

In particular embodiments, one of the columns is an anchoring column and presents an anchoring surface with anchoring means configured for receiving the installation of a wind turbine tower.

Anchoring the wind turbine tower in one of the columns allows a better fixing and a better design of the foundation device, as it has with a fixed reference for the wind turbine tower.

In particular embodiments, the device further comprises
a plurality of first plates anchored in a reinforcement ring of the anchoring column;
a plurality of second plates adapted to be fixed to a reinforcement ring of a wind turbine tower;
a plurality of lifting elements, each of which is configured to exert pressure between one of the first plates and one of the second plates.

These adjustment elements allow an inclination adjustment once the tower is positioned in the anchoring column. The inclination adjustment is usually performed once the foundation device is already supported on the seabed, so as to be able to take a reliable reference of the vertical. The reinforcement rings allow stresses caused by the force of the lifting elements to be absorbed.

In particular embodiments, at least one portion of one of the lifting elements is embedded on a second plate.

The pistons of the lifting element can thereby serve as a guide during the levelling of the wind turbine tower, preventing its imbalance.

In particular embodiments, the device further comprises reversible pumping means to selectively fill or empty the inside of the main body.

The installation of pumping means which allow both the filling and the emptying of the inside of the main body is an advantage: the filling function allows to control the ballasting process, while the emptying function allows to refloat the foundation device so it can be dismantled or inspected, allowing the later reuse thereof.

In particular embodiments, both the upper face and the lower face have an annular polygon shape, wherein both the inner perimeter and the outer perimeter are polygons with the same number of sides.

The use of polygons in the upper and lower faces leads to great ease in manufacture, as it allows the lateral wall to be built by means of rectangular panels.

In particular embodiments, both the upper face and the lower face have a ring shape, such that both the inner perimeter and the outer perimeter are closed curves, such as circles or ellipses.

A single closed curve can offer other advantages, such as lower resistance to forward movement in the water.

In particular embodiments, the main body is made of concrete.

The manufacture of foundation elements using concrete is a widespread practice; the present invention is perfectly compatible with these methods of manufacture.

In a second inventive aspect, the invention provides a method of installing a wind turbine tower, comprising the steps of
providing a foundation device according to any of the preceding claims;
providing a wind turbine tower;
positioning the assembly formed by the foundation device and the wind turbine tower at an offshore installation site; and
filling the hollow main body with a fluid, such that the sinking of the assembly formed by the foundation device and the wind turbine tower takes place.

This method allows for great stability while the foundation device is being taken to the installation site, due to its particular geometry that is hollow on the inside.

This method is compatible both for the option of installing the wind turbine tower on the foundation assembly on land and then move the entire assembly to the installation site, and for the option of assembling the wind turbine tower while it is afloat and then transporting and subsequently ballasting it.

In particular embodiments, the method comprises the steps of
attaching the wind turbine tower to the installation column of the foundation device, and
moving the assembly formed by the foundation device and the wind turbine tower to an offshore installation site.

In this particular case, the tower is attached to the installation column before moving the entire assembly by sea to the installation site. The attachment of the tower on land facilitates the process and prevents moving complex machines to the installation site. Furthermore, on land, the attachment is not subjected to the movement of the waves.

In particular embodiments, the method further comprises the steps of
applying pressure between a first plate and a second plate by means of a lifting device so as to vary the inclination of the wind turbine tower with respect to the anchoring column, creating a levelling gap between the anchoring surface and the wind turbine tower; and
introducing a securing element in the levelling gap.

This later step of levelling allows to correct the inclination of the tower once the foundation device rests on the seabed. Because it is not always possible to provide a completely flat floor, it is possible for the foundation device to have a slight inclination. This would inevitably be transmitted to the tower were it not for this additional step.

DESCRIPTION OF THE FIGURES

To complete the description and make it easier to understand the invention, a set of figures is attached to the description. These figures are part of the description and illustrate a particular example of the invention, which is not to be interpreted as being limiting of the scope thereof, but rather as a mere example of how the invention can be carried out. This set of figures comprises the following.

In order to help to better understand the technical features of the invention, the mentioned figures include a series of reference numbers, in which the following is depicted in an illustrative and non-limiting manner:

| | |
|---|---|
| 1 | Main body |
| 2 | Lower face |
| 21 | Outer perimeter of the lower face |
| 22 | Inner perimeter of the lower face |
| 3 | Upper face |
| 31 | Outer perimeter of the upper face |
| 32 | Inner perimeter of the upper face |
| 4 | Outer lateral wall |
| 5 | Inner lateral wall |
| 6 | Columns |
| 60 | Anchoring column |
| 61 | Anchoring surface of the anchoring column |
| 62 | Anchoring means of the anchoring column |
| 63 | Reinforcement ring |
| 7 | First plate |
| 8 | Second plate |
| 9 | Lifting jacks |
| 10 | Foundation device |
| 11 | Pumping system |
| 12 | Floor slab |
| 100 | Wind turbine tower |

DETAILED DESCRIPTION OF THE INVENTION

A preferred embodiment of the present invention, which is provided for illustrating but not limiting purposes, is described below.

Figure 1A:
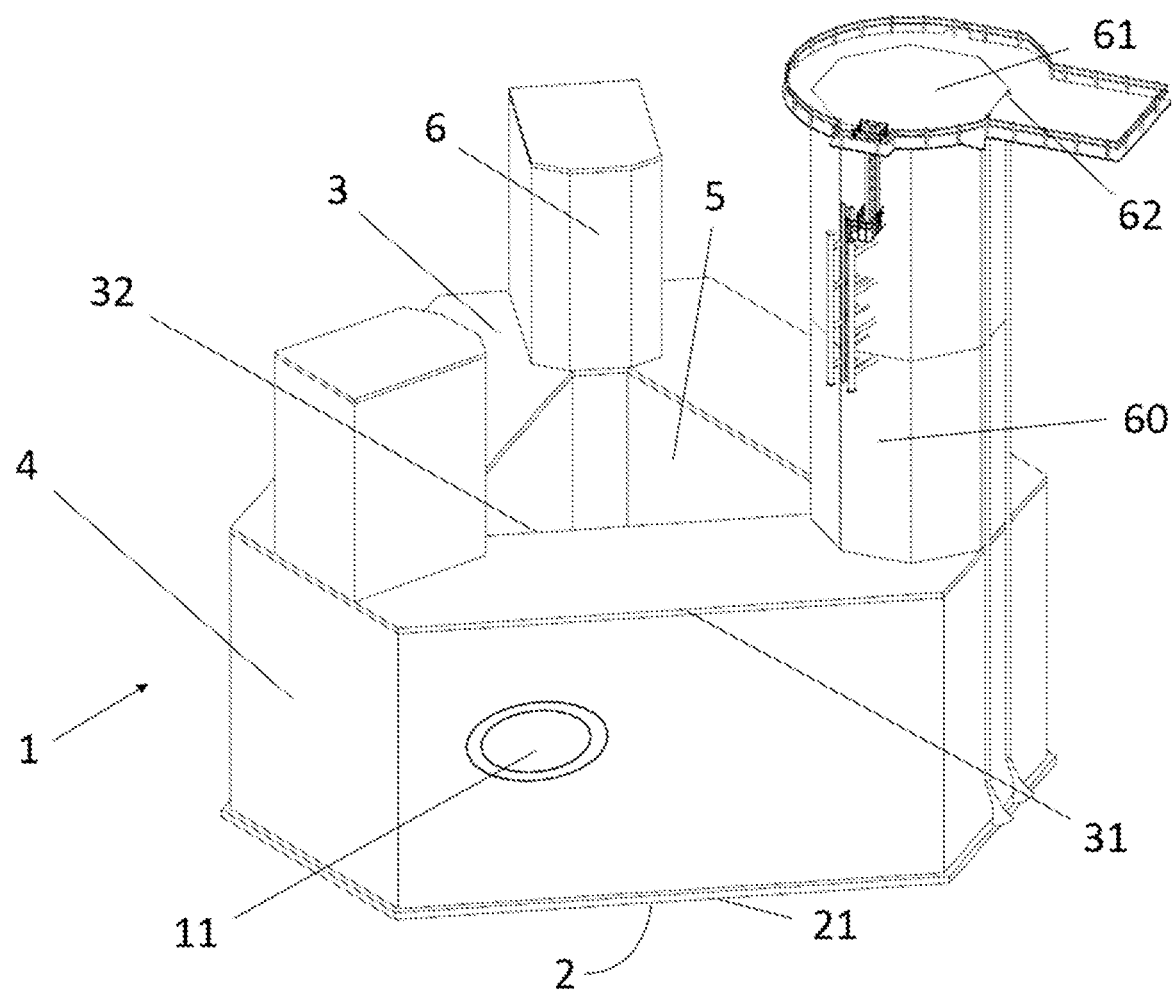
FIGS. 1a and 1b show two particular examples of foundation devices for a wind turbine tower according to the invention.
Figure 1B:
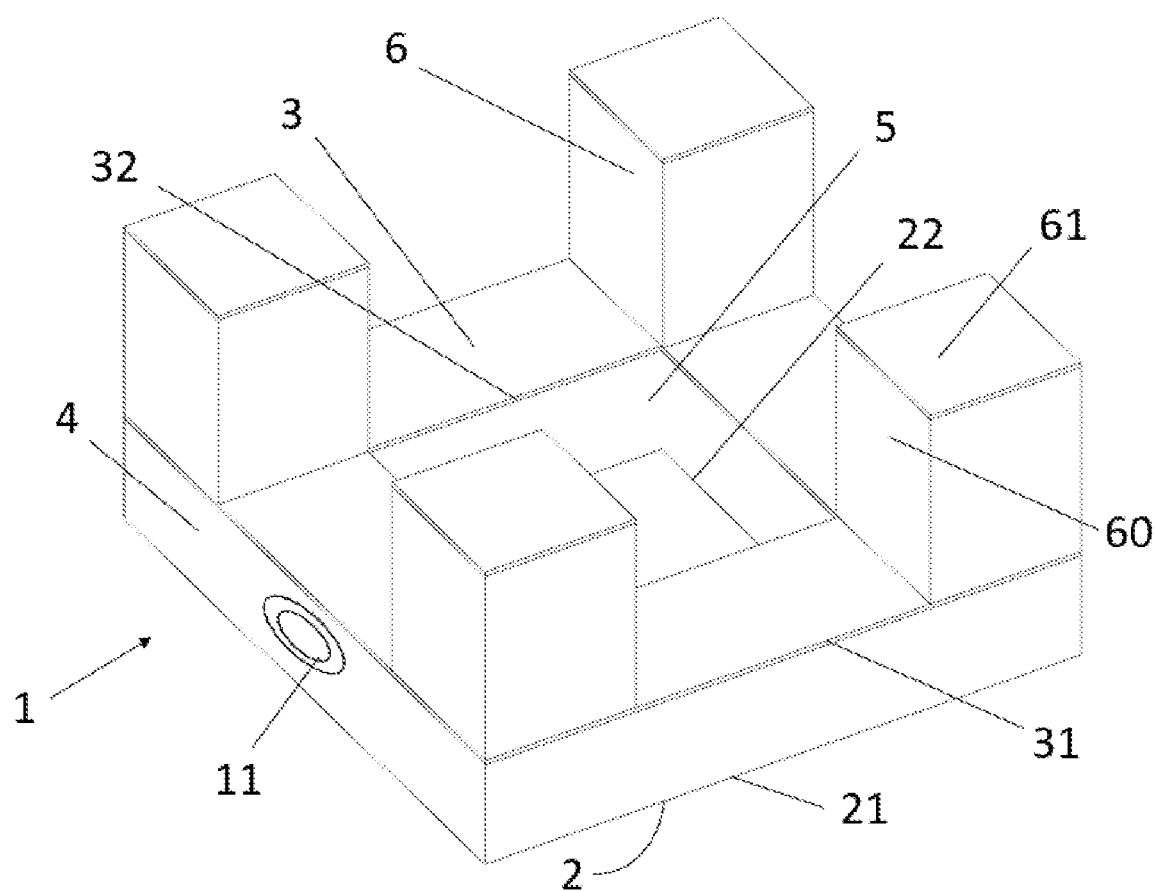

FIGS. 1a and 1b show two particular examples of foundation devices 10 for a wind turbine tower according to the invention.

Each device 10 comprises a hollow main body 1 with a lower face 2 intended for being supported on the seabed and an upper face 3 opposite the lower face 2.

Both the lower face 2 and the upper face 3 contain a hollow space, each of the faces thus comprising an outer perimeter 21, 31 and an inner perimeter 22, 32.

Likewise, both the upper face 3 and the lower face 2 have an annular polygonal shape. However, this polygonal shape can be changed in other embodiments. In FIGS. 1a and 1b, a hexagon and a square are shown, but triangles, pentagons, heptagons, octagons, etc., can be used, or they can be made with closed curves, such as circles, ovals or ellipses.

Since both the upper face 3 and the lower face 2 have an annular polygon shape, hollow in the center thereof, the main body 1 further comprises an outer lateral wall 4 arranged between the outer perimeter 21 of the lower face 2 and the outer perimeter 31 of the upper face 3, and an inner lateral wall 5 between the inner perimeter 22 of the lower face 2 and the inner perimeter 32 of the upper face 3.

In this way, the transverse metacentric radius of the assembly, understood as the ratio between the transverse inertia of the device with respect to a horizontal axis and the displacement volume, is higher than in the known solutions, which allows for the same stability to be obtained with a much lower weight, facilitating moving the assembly and reducing the ballasting time.

In addition to this main body 1, the foundation device 10 also comprises a plurality of columns 6 that project from the upper face of the main body. These columns 6 are hollow, and the inside thereof is in communication with the inside of the main body.

The vertical flotation columns allow the foundation device 10 to be immersed when needed without the aid of auxiliar, large tonnage vessels, by simply adding ballast water. These columns keep values of inertia in flotation at suitable stability values, with the main advantage being the reduction of installation costs, both in terms of materials and in terms of auxiliary means, and the immersion process can be performed in a safe, efficient and rapid manner.

The shape of these columns can be wide-ranging, provided that it maintains inertia in flotation at acceptable values. Therefore, circular or polygonal sections are allowable.

One of these columns is an anchoring column 60 and presents an anchoring surface 61 with anchoring means 62 configured for receiving the installation of a wind turbine tower. These anchoring means 62 are configured for providing a screwed attachment between the column and the tower.

Furthermore, as it can be observed in the figure, the foundation device 10 also includes reversible pumping means 11 to selectively fill or empty the inside of the main body 1 during the installation and ballasting operations and dismantling or flotation operations.

The pumping system is configured for reversible operation, allowing the deballasting of the structure and later transport thereof for dismantling once the service life of the platform has ended. To that end, it is designed with protection against corrosion, and both the pumps and a number of valves are replaceable throughout the life cycle of the structure. The pump chamber is located in a dry room in the foundation device 10.

Both the main body 1 and the columns 6 are made of concrete.

FIGS. 2a to 2d show different steps of a method of installation according to the invention.

Figure 2A:
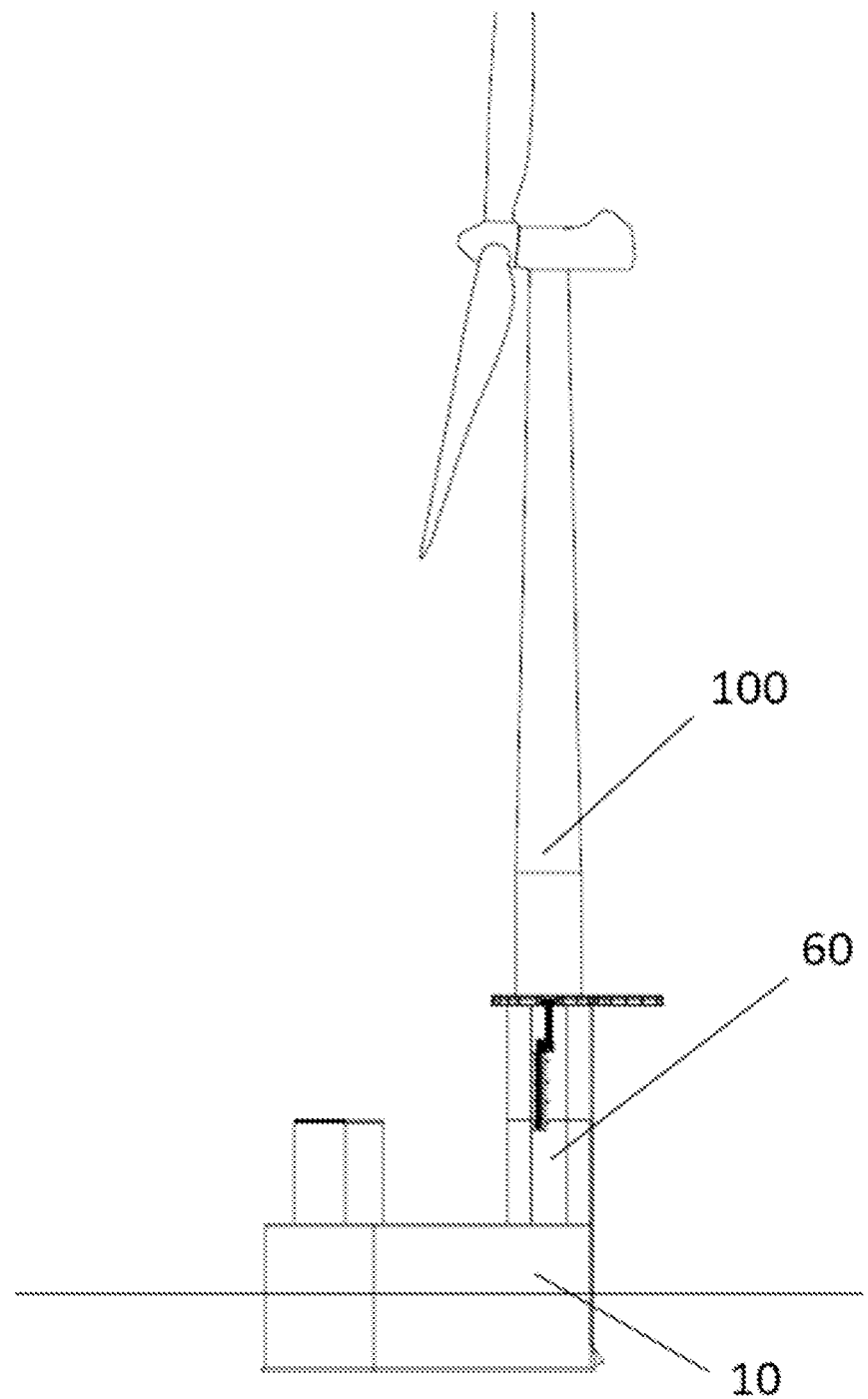
FIGS. 2a to 2d show different steps of a method of installation according to the invention.

FIG. 2a shows the assembly formed by the foundation device 10 and a wind turbine tower 100, which has been assembled on the installation column 60 on land.

Being able to install the equipment with land means and in a port setting reduces the logistics process and eliminates the risks inherent to any operation at sea and between two bodies with different relative movements due to their different buoyancies.

Figure 2B:
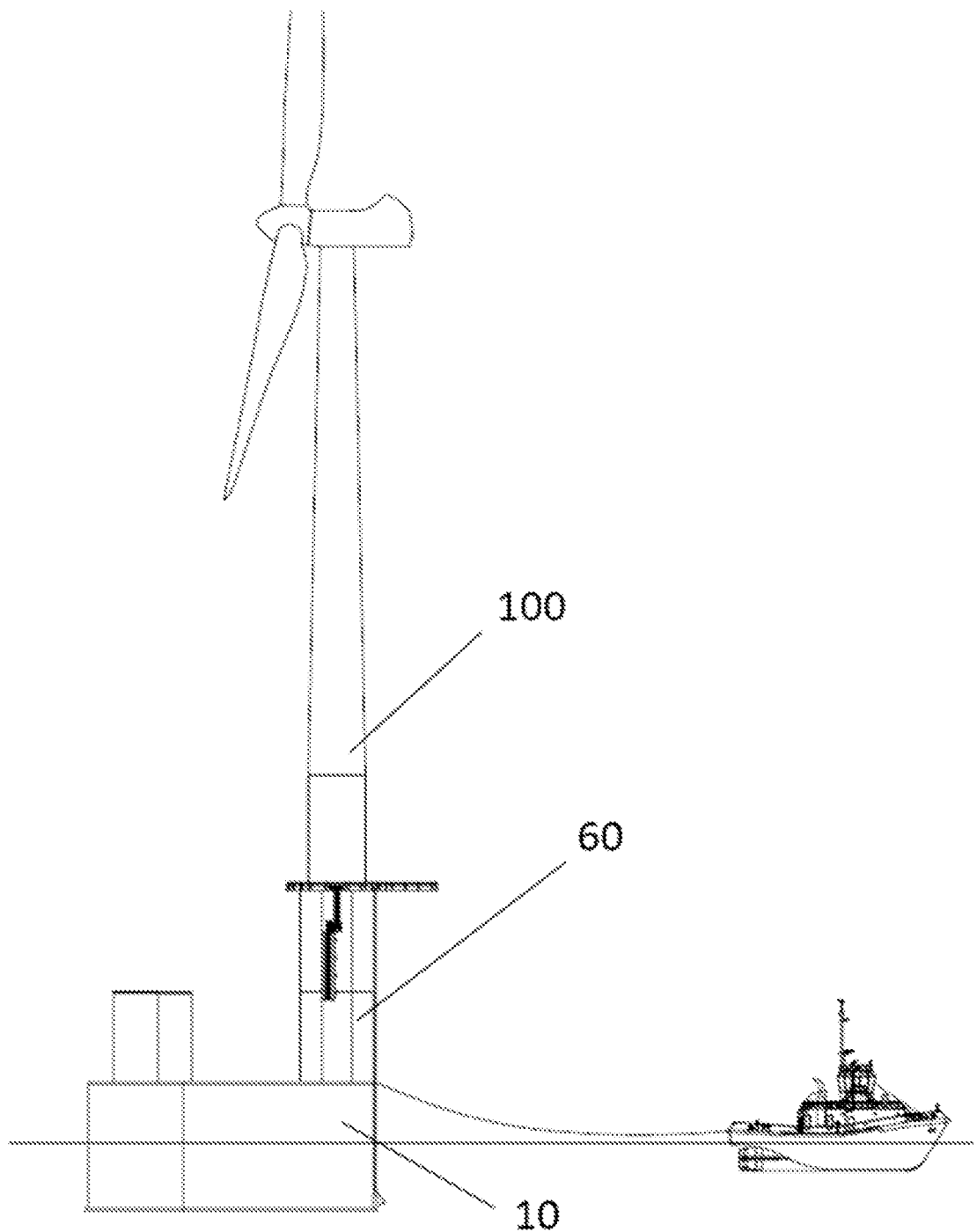

Next, as observed in FIG. 2b, a number of tugboats may transport the structure to the installation site.

Figure 2C:
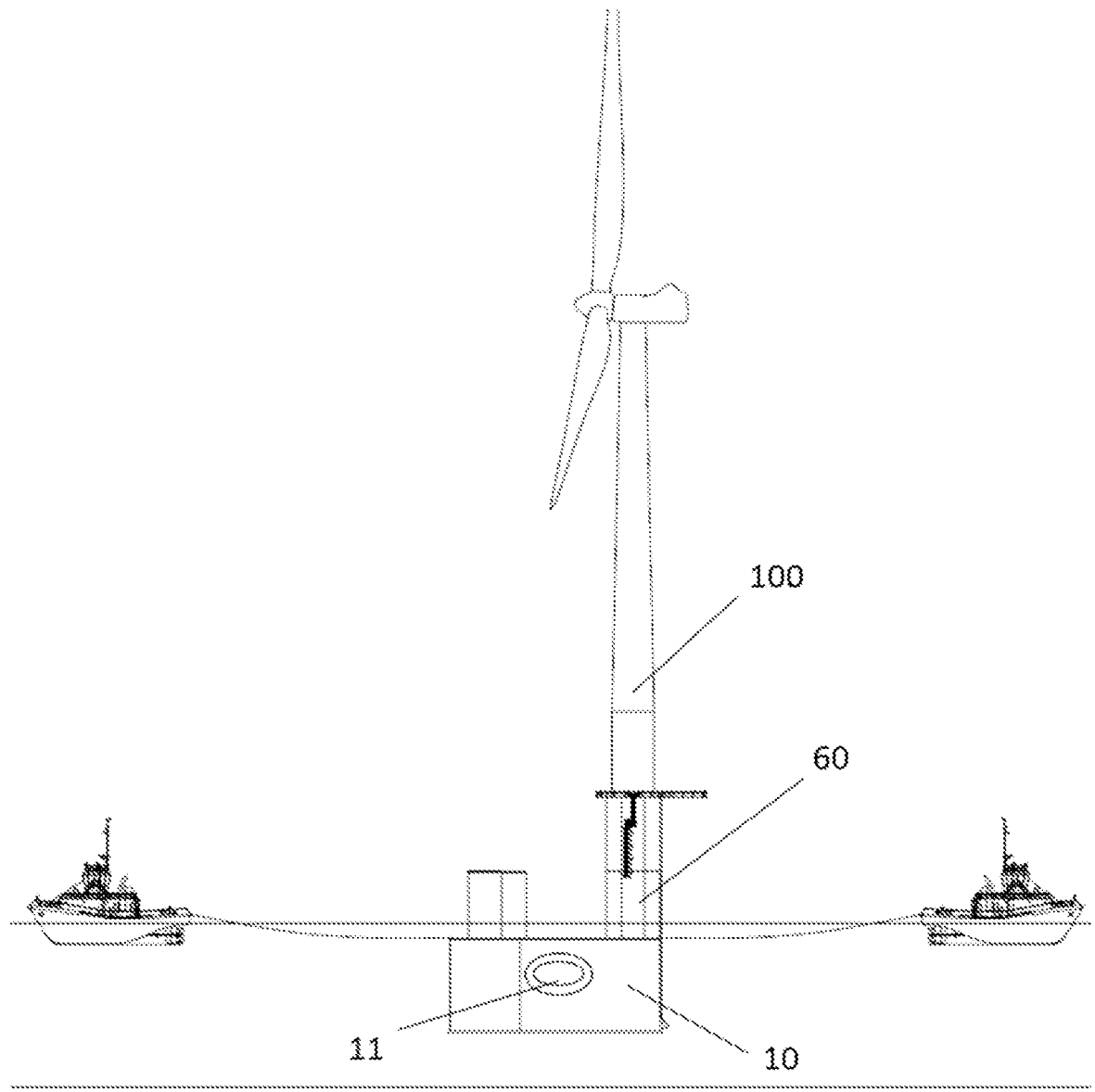
Figure 2D:
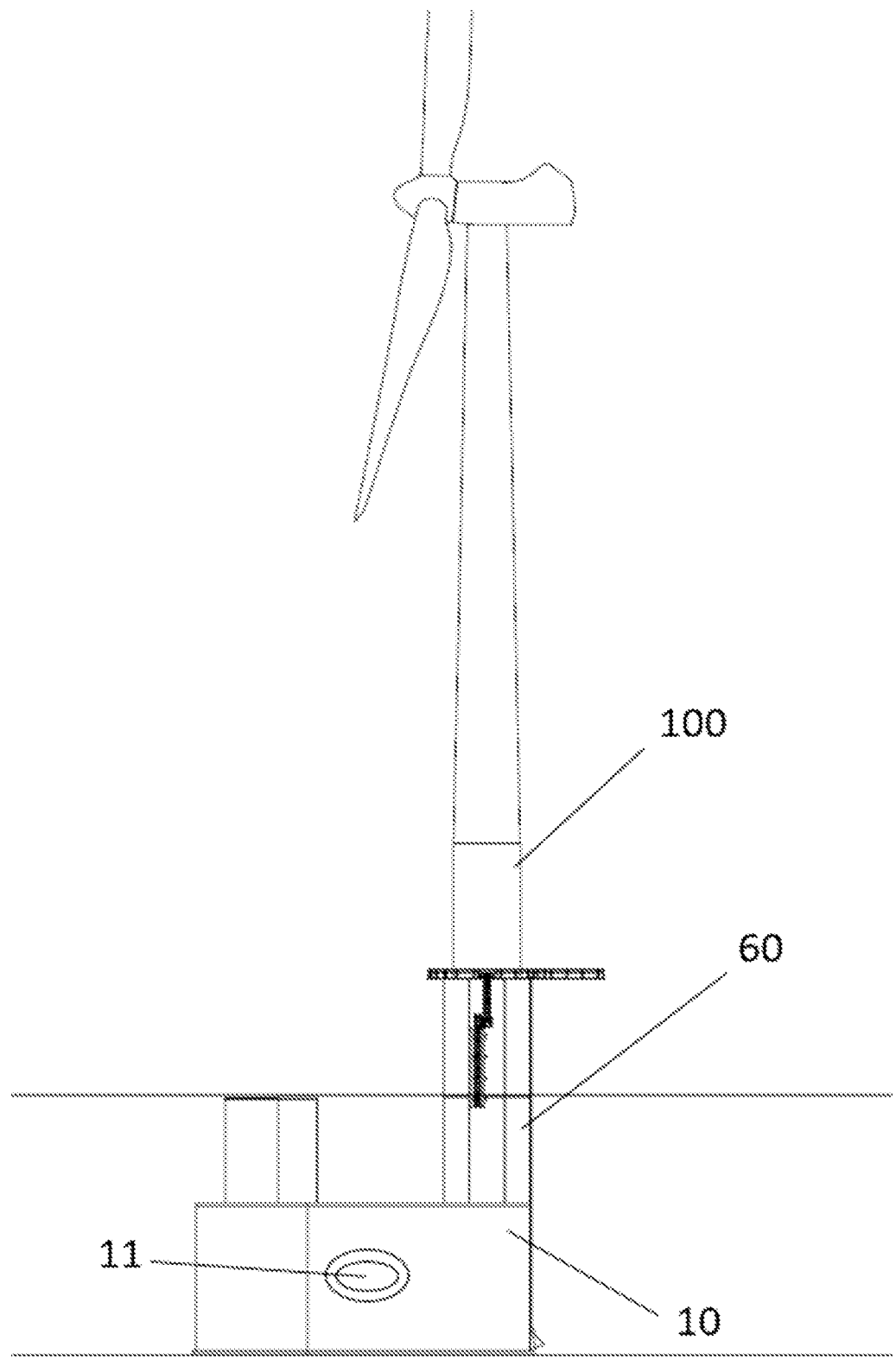

There, as shown in FIG. 2c, the pumping system 11 will be activated for filling the main body 1 with water. This will give rise to the immersion of the platform, as illustrated in FIG. 2d. During this process, only the assistance of the tugboats will be needed to keep the platform in position, due to the flotation columns which, as explained, ensure that during immersion no additional auxiliary means are needed.

Figure 3:
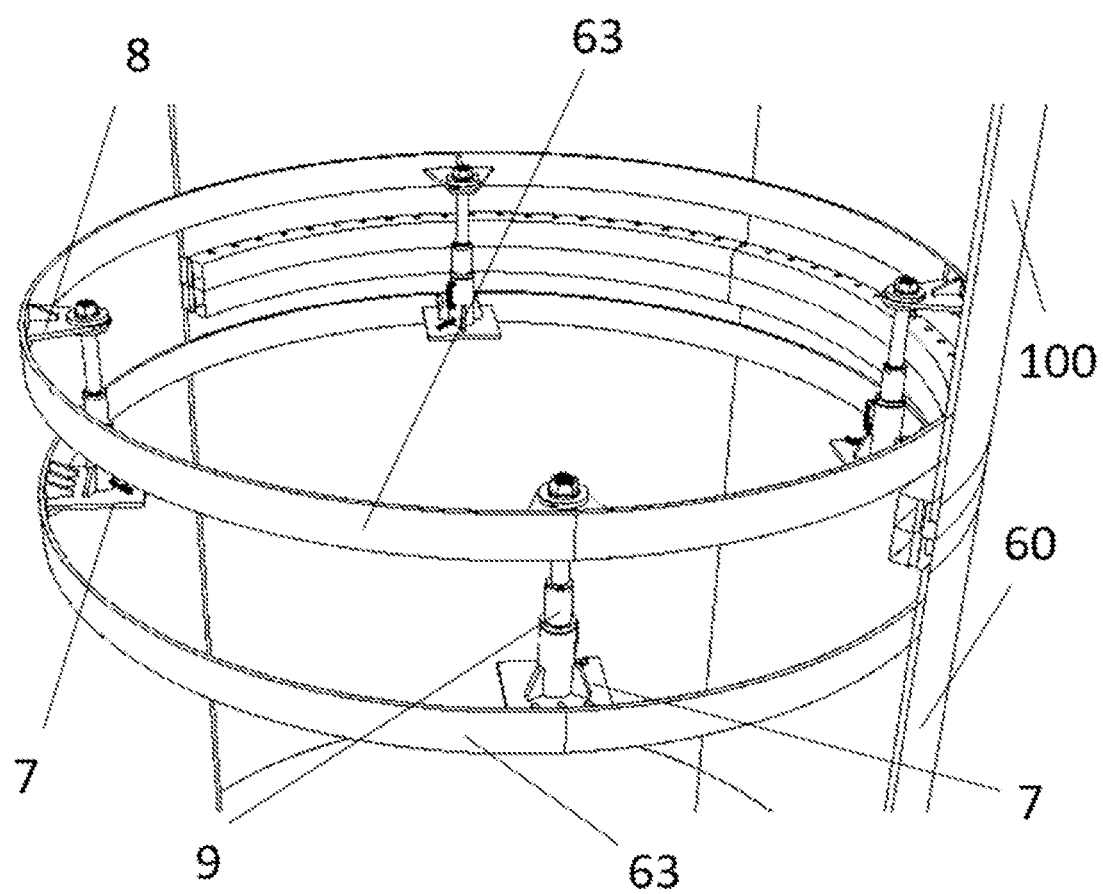
FIG. 3 shows a detail of the connection between the column of a foundation device and a wind turbine tower, in which a system for correcting the inclination of a foundation device according to the invention can be seen.

FIG. 3 shows a detail of the connection between the anchoring column 60 and the wind turbine tower 100, in which a system for correcting the inclination of the wind turbine tower 100 can be seen.

This system comprises elements both in the anchoring column 60 and in the wind turbine tower 100:
- a plurality of first plates 7 anchored to a reinforcement ring 63 of the anchoring column 60;
- a plurality of second plates 8 fixed to a reinforcement ring 63 of the wind turbine tower 100;
- a plurality of hydraulic lifting cylinders 9, each of which is configured to exert pressure between one of the first plates 7 and one of the second plates 8.

The plates 7, 8, arranged perpendicular to the respective reinforcement ring 63 are in charge of housing the body or base of the hydraulic cylinders 9. The plates 7, 8 perpendicular to the reinforcement rings 63 are in charge of receiving the force of the piston of the hydraulic cylinder 9.

To prevent the tower from becoming unbalanced when it is raised up, the pistons themselves act like a guide, the hydraulic cylinder 9 being embedded on the plate 8 of the tower 100.

Although the hydraulic cylinder 9 acts only on the plate 8 of the tower 100, auxiliary guides can be used to prevent the tower 100 from becoming destabilized during the levelling process.

These elements shown in FIG. 3 are used in a step of correction, performed after the step illustrated in FIG. 2d. Once the foundation device 10 has been moored, this step of correction involves

- using the hydraulic lifting cylinders 9 for applying pressure between a first plate 7 anchored to a reinforcement ring 63 of the anchoring column 60 and a second plate 8 anchored to a reinforcement ring 63 of the wind turbine tower 100, so as to vary the inclination of the wind turbine tower 100 with respect to the anchoring column 60, creating a levelling gap between the anchoring surface and the wind turbine tower; and
- introducing a securing element in the levelling gap.

To close the space generated by the levelling gap, different solutions, such as, for example, metal sheets, an epoxy paste and metallic material or an epoxy liquid and metallic material, can be used.

In this way, the fixing of the wind turbine tower 100 in its new inclination thereby takes place, endeavoring for the final result to be as vertical as possible.

Figure 4:
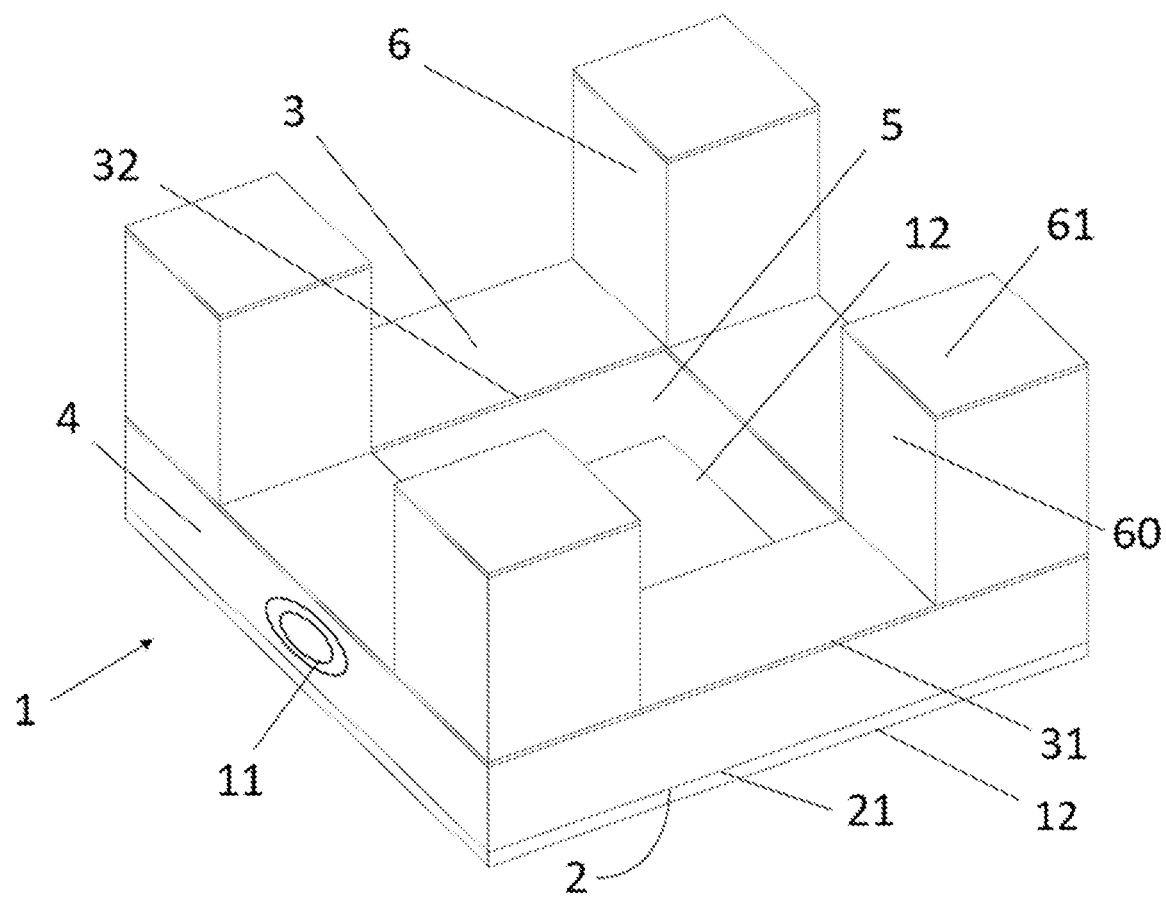
FIG. 4 shows an alternative embodiment of the foundation device.

FIG. 4 shows an alternative embodiment of the foundation device. In this case, starting from the device of FIG. 1b, a floor slab 12 has been added on the lower face of the device.

The height of this floor slab 12, measured in the vertical direction, from the lower face 2 to the upper face 3 is considerably less than the distance between said lower face 2 and upper face 3. In this case, the ratio between the height of the floor slab 12 and the distance between said faces is 15%.

By means of this floor addition, the weight of the device increases slightly, but an important reduction of the draft in a port is obtained, therefore facilitating the launching of the device and the initial transport steps.

The invention claimed is:

1. A foundation device for a wind turbine tower, the device being configured to be supported on the seabed, comprising:
    a hollow main body comprising:
        a lower face intended for being supported on the seabed;
        an upper face opposite the lower face, wherein the lower face is defined by a surface contained between a first outer perimeter and a first inner perimeter and the upper face is defined by a surface contained between a second outer perimeter and a second inner perimeter;
        an outer lateral wall arranged between the first outer perimeter of the lower face and the second outer perimeter of the upper face; and
        an inner lateral wall between the first inner perimeter of the lower face and the second inner perimeter of the upper face;
    a plurality of columns that project from the upper face of the main body;
    the device being characterized in that one of the columns is an anchoring column and presents an anchoring surface configured for receiving the installation of a wind turbine tower, and in that the device further comprises
        a reinforcement ring attached to the anchoring column,
        a plurality of first plates anchored in the reinforcement ring;
        a plurality of second plates adapted to be fixed to a reinforcement ring of a wind turbine tower; and
        a plurality of lifting elements, each of which is configured to exert pressure between one of the first plates and one of the second plates.

2. The device according to claim 1, further comprising a floor slab positioned on the lower face, the floor slab being a polygonal surface without inner spaces.

3. The device according to claim 2, wherein the distance between the upper face and the lower face is at least four times greater than the height of the floor slab, where the height of the floor slab is measured in the direction parallel to the distance between the upper face and the lower face.

4. The device according to claim 1, wherein at least one of the columns is hollow.

5. The device according to claim 4, wherein the inside of at least one of the columns is in communication with the inside of the main body.

6. The device according to claim 1, wherein at least one portion of one of the lifting elements is embedded on a second plate.

7. The device according to claim 1, further comprising a reversible pump to selectively fill or empty the inside of the main body.

8. The device according to claim 1, wherein both the upper face and the lower face have an annular polygon shape, wherein both the inner perimeter and the outer perimeter are polygons with the same number of sides.

9. The device according to claim 1, wherein the main body is made of concrete.

10. A method of installing a wind turbine tower, comprising the steps of
    providing a foundation device according to claim 1;
    providing a wind turbine tower;
    positioning the assembly formed by the foundation device and the wind turbine tower at an offshore installation site; and
    filling the hollow main body with a fluid, such that the sinking of the assembly formed by the foundation device and the wind turbine tower takes place.

11. A method of installing a wind turbine tower, comprising the steps of
    providing a foundation device according to claim 1;
    providing a wind turbine tower;
    attaching the wind turbine tower to the installation column of the foundation device at an offshore installation site; and
    filling the hollow main body with a fluid, such that the sinking of the assembly formed by the foundation device and the wind turbine tower takes place.

12. The method according to claim 11, further comprising the steps of
    applying pressure between a first plate and a second plate with a lifting device to vary the inclination of the wind turbine tower with respect to the anchoring column, creating a levelling gap between the anchoring surface and the wind turbine tower; and
    introducing a securing element in the levelling gap.

* * * * *